United States Patent
Prucka et al.

(10) Patent No.: US 12,510,037 B1
(45) Date of Patent: Dec. 30, 2025

(54) CATALYST PROTECTION DURING MISFIRE

(71) Applicant: FCA US LLC, Auburn Hills, MI (US)

(72) Inventors: Michael J Prucka, Auburn Hills, MI (US); Joshua M Burt, Auburn Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 18/754,319

(22) Filed: Jun. 26, 2024

(51) Int. Cl.
| | |
|---|---|
| F02D 41/02 | (2006.01) |
| F01N 9/00 | (2006.01) |
| F02D 41/00 | (2006.01) |
| F02D 41/14 | (2006.01) |
| F02D 41/22 | (2006.01) |

(52) U.S. Cl.
CPC ........... *F02D 41/0235* (2013.01); *F01N 9/00* (2013.01); *F02D 41/0082* (2013.01); *F02D 41/1497* (2013.01); *F02D 41/22* (2013.01); *F01N 2900/08* (2013.01)

(58) Field of Classification Search
CPC ............ F02D 41/0235; F02D 41/0082; F02D 41/1497; F02D 41/22; F01N 9/00; F01N 2900/08
See application file for complete search history.

(56) References Cited

U.S. PATENT DOCUMENTS

| | | | | | |
|---|---|---|---|---|---|
| 5,301,546 | A | * | 4/1994 | Inada | F02P 17/12 73/114.04 |
| 5,577,475 | A | * | 11/1996 | De Backer | F02P 7/077 73/114.02 |
| 5,956,941 | A | * | 9/1999 | Cullen | F01N 3/0842 60/277 |
| 6,736,113 | B1 | * | 5/2004 | Ott | F02P 17/12 123/481 |
| 7,571,640 | B2 | * | 8/2009 | Andrews | G01M 15/11 73/114.75 |
| 2002/0134357 | A1 | * | 9/2002 | White | F02D 41/0087 123/481 |
| 2005/0241376 | A1 | * | 11/2005 | Miyata | F02D 41/1497 73/114.04 |
| 2006/0112932 | A1 | * | 6/2006 | Toyoda | F02D 41/1498 123/690 |
| 2011/0167797 | A1 | * | 7/2011 | Gibson | F01N 11/002 60/285 |

(Continued)

FOREIGN PATENT DOCUMENTS

JP     H09184789 A   *   7/1997

*Primary Examiner* — Matthew T Largi
(74) *Attorney, Agent, or Firm* — Jeremy J. Klobucar

(57) ABSTRACT

A vehicle includes an internal combustion engine having at least one cylinder bank, an exhaust system having a catalyst, and an engine control system with a controller configured to perform an operation to protect the catalyst during a cylinder misfire event. The operation includes monitoring and counting a number of cylinder misfires on each cylinder bank, determining if the cylinder misfire count exceeds a predetermined threshold count, and when the cylinder misfire count exceeds the predetermined threshold count in a particular cylinder bank, subsequently (i) setting a reduced engine torque limit and (ii) operating the particular cylinder bank in a stoichiometric fuel/air ratio, to thereby facilitate preventing excessively high temperatures at the catalyst due to the misfire event.

16 Claims, 2 Drawing Sheets

(56) References Cited

U.S. PATENT DOCUMENTS

2011/0202260 A1* 8/2011 Cunningham .......... F02D 17/02
 701/104
2016/0333764 A1* 11/2016 Sugimoto ........... F02D 41/2406

* cited by examiner

CATALYST PROTECTION DURING MISFIRE

FIELD

The present application relates generally to vehicle engine systems and, more particularly, to vehicle engine system to protect aftertreatment catalysts during cylinder misfire.

BACKGROUND

Catalysts are typically implemented in vehicle exhaust systems for treating exhaust gas produced by an internal combustion engine to mitigate or eliminate emissions. An engine cylinder misfire typically results in an unburned fuel/air mixture reaching the catalyst, which can then combust in or near the catalyst. This can potentially result in large temperature increases at the catalyst that could potentially lead to possible physical damage. Therefore, while such conventional systems do work for their intended purpose, it is desirable to provide continuous improvement in the relevant art.

SUMMARY

In accordance with one example aspect of the invention, a vehicle is provided. In one example implementation, the vehicle includes an internal combustion engine having at least one cylinder bank, an exhaust system having a catalyst, and an engine control system with a controller configured to perform an operation to protect the catalyst during a cylinder misfire event. The operation includes monitoring and counting a number of cylinder misfires on each cylinder bank, determining if the cylinder misfire count exceeds a predetermined threshold count, and when the cylinder misfire count exceeds the predetermined threshold count in a particular cylinder bank, subsequently (i) setting a reduced engine torque limit and (ii) operating the particular cylinder bank in a stoichiometric fuel/air ratio, to thereby facilitate preventing excessively high temperatures at the catalyst due to the misfire event.

In addition to the foregoing, the described vehicle may include one or more of the following features: wherein the controller is programmed to operate the cylinder bank normally with a target fuel/air ratio if the cylinder misfire count for that cylinder bank does not exceed the predetermined threshold count; wherein the controller is programmed to decrement the cylinder misfire count if a predetermined amount of time has passed without a cylinder misfire in the cylinder bank; and wherein the controller is programmed to set a misfire fault if the number of cylinder misfires exceeds a maximum misfire count.

In addition to the foregoing, the described vehicle may include one or more of the following features: wherein the predetermined threshold count is less than the maximum misfire count to pre-emptively protect the catalyst during the cylinder misfire event; wherein the controller is programmed to set the reduced engine torque limit by limiting airflow through the internal combustion engine and catalyst; wherein the internal combustion engine includes a first cylinder bank with four cylinders and a second cylinder bank with four cylinders; and wherein the exhaust system includes a first exhaust passage with a first catalyst configured to receive exhaust gas from the first cylinder bank, and a second exhaust passage with a second catalyst configured to receive exhaust gas from the second cylinder bank.

In accordance with another example aspect of the invention, a method of performing a catalyst protection operation during a cylinder misfire of an engine having one or more cylinder banks is provided. In one example implementation, the method includes monitoring and counting, by a controller, a number of cylinder misfires on each cylinder bank; determining, by the controller, if the cylinder misfire count exceeds a predetermined threshold count; and when the cylinder misfire count exceeds the predetermined threshold count in a particular cylinder bank, subsequently, by the controller, (i) setting a reduced engine torque limit and (ii) operating the particular cylinder bank in a stoichiometric fuel/air ratio, to thereby facilitate preventing excessively high temperatures at a catalyst due to the cylinder misfire event.

In addition to the foregoing, the described method may include one or more of the following features: operating, by the controller, the cylinder bank normally with a target fuel/air ratio if the cylinder misfire count for that cylinder bank does not exceed the predetermined threshold count; by the controller, decrementing the cylinder misfire count if a predetermined amount of time has passed without a cylinder misfire in the cylinder bank; by the controller, setting a misfire fault if the number of cylinder misfires exceeds a maximum misfire count; and wherein the predetermined threshold count is less than the maximum misfire count to pre-emptively protect the catalyst during the cylinder misfire event.

In addition to the foregoing, the described method may include one or more of the following features: wherein said setting a reduced engine torque limit includes limiting airflow through the internal combustion engine and catalyst; wherein the internal combustion engine includes a first cylinder bank with four cylinders and a second cylinder bank with four cylinders; and wherein the exhaust system includes a first exhaust passage with a first catalyst configured to receive exhaust gas from the first cylinder bank, and a second exhaust passage with a second catalyst configured to receive exhaust gas from the second cylinder bank.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings references therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DESCRIPTION

Figure 1:
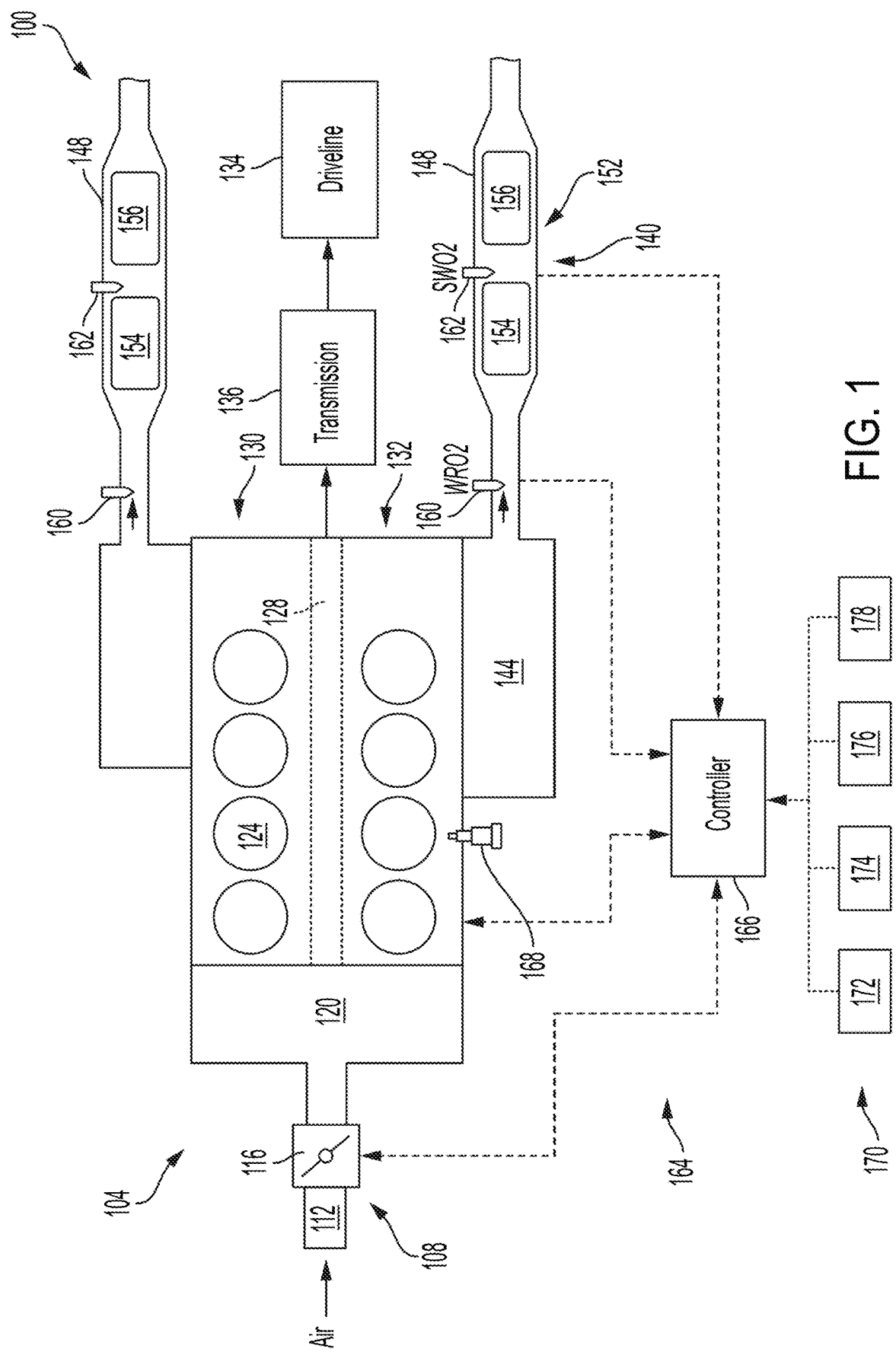
FIG. 1 is a schematic diagram of an example vehicle having an internal combustion engine and an exhaust system in accordance with the principles of the present application.

As previously mentioned, some vehicle exhaust systems include a catalytic converter, which is configured to convert exhaust gas constituents such as carbon monoxide (CO), carbon dioxide ($CO_2$), oxygen ($O_2$), hydrocarbons (HC), and nitrogen oxides (NOx) to reduce emissions. An engine cylinder misfire may cause unburned fuel/air mixture to reach the catalyst and combust, resulting in an undesirable catalyst temperature increase. One strategy to counter this scenario involves disabling all fuel enrichment to the cylinders. However, this may lead to high catalyst temperatures on cylinder banks that are not experiencing misfire while undesirably reducing torque. Moreover, high-performance engines may experience excessively high catalyst temperatures due to the accumulation of misfire events before a misfire fault is posted.

Accordingly, the systems and methods described herein are configured to preemptively act prior to the setting of a misfire fault by controlling the fuel/air ratio of each cylinder bank independently based on whether the given cylinder bank is experiencing any misfire events. In one example, the preemptive catalyst protection operation is initiated once a predetermined number of weighted misfire counts occurs. The operation then reduces the engine torque (via airflow), removes enrichment on the bank(s) where misfire events are occurring, and maintains enrichment for protection on the bank(s) where misfire events are not occurring. Accordingly, the catalyst protection operation allows for the catalyst temperature to remain below a predetermined limit while still allowing the diagnostic system to set faults as appropriate per regulations.

In one detailed example, the engine control system monitors for activation conditions and subsequently performs any necessary reaction operations. Monitoring activation conditions includes counting and summing misfires for each cylinder in each engine bank over a predetermined time period. These counts may be weighted more heavily in certain speed and load regions (e.g., high speed, high load). If no misfire activity is observed for a specified number of engine revolutions on the given bank, then that bank counter may be decremented at a predetermined rate. If the counter of any bank exceeds a predetermined threshold, then the catalyst protection feature is enabled for that bank. Additionally, the catalyst protection feature may be enabled if a modeled catalyst temperature exceeds a predetermined temperature threshold.

Upon activation of the catalyst protection feature, the engine control system is configured to perform a torque limit control and a fuel/air ratio control. The torque limit control includes establishing an upper torque limit through a torque management strategy to limit airflow through the catalyst when any of the bank specific enable conditions are active. Any torque requests from the driver or other system in control of the torque path will be limited to at or below this imposed torque limit. The torque request will be unconstrained when the catalyst protection function is inactive.

The fuel/air ratio control includes setting the target fuel/air ratio to stoichiometric conditions on whichever bank contains cylinders that are misfiring based on the bank specific enable conditions previously described. A bank that does not have misfiring cylinders will continue to operate at its normal target fuel/air ratio, which may contain enrichment (i.e., fuel rich) to facilitate maintaining catalyst temperatures below the predetermined temperature limit.

Referring now to FIG. 1, a diagram of an example vehicle 100 is illustrated. The vehicle 100 comprises an internal combustion engine 104 capable of operating with various target fuel/air ratios, including a rich fuel/air ratio. Non-limiting examples of a type of fuel that the engine 104 could utilize include gasoline, compressed natural gas (CNG), and liquefied natural gas (LNG). The engine 104 draws air through an induction system 108 comprising an induction passage 112, a throttle valve 116, and an intake manifold 120. The air in the intake manifold 120 is dispersed to cylinders 124 and combined with fuel to form a fuel/air mixture that is combusted (e.g., by spark plugs) within cylinders 124 to drive pistons (not shown) that rotatably turn a crankshaft 128 generating drive torque. A first portion (e.g., half) of the cylinders 124 are arranged in a first cylinder bank 130, and a second portion of the cylinders are arranged in a second cylinder bank 132. While four cylinders and two banks are shown, it will be appreciated that the engine 104 could include any suitable number of cylinders (four, six, etc.) and banks (one, three, etc.).

The drive torque is transferred to a driveline 134 via a transmission 136. It will be appreciated that the vehicle 100 could have a hybrid driveline where the drive torque generated by the engine 104 is transferred to an electric motor or generator instead of or in addition to the transmission 136. Exhaust gas resulting from combustion is expelled from the cylinders 124 into an exhaust system 140. The exhaust system 140 comprises an exhaust manifold 144, an exhaust passage 148, and a catalytic converter or catalyst 152 disposed along the exhaust passage 148 and configured to mitigate or eliminate pollutants in the exhaust gas. While the engine 104 is illustrated with an exhaust passage 148 and catalyst 152 for each cylinder bank, it will be appreciated that the exhaust system 140 may include various other arrangements, such as a single exhaust passage.

In one example, the catalyst 152 includes an upstream brick or catalyst 154 and a downstream brick or catalyst 156 for catalytic reactions. For example, the catalyst 152 may oxidize CO and HC (i.e., combines them with O2) to produce carbon dioxide (CO2) and water (H2O), as well as reduce NOx to nitrogen (N2) and O2. The exhaust system 140 further comprises an upstream exhaust gas O2 sensor 160 and a downstream exhaust gas O2 sensor 162. In the example embodiment, O2 sensor 160 is disposed upstream of the first catalyst 154, and the second O2 sensor 162 is disposed "mid-brick" between the first and second catalysts 154, 156. It will be appreciated that the techniques of the present disclosure could be achieved using only one of these sensors 160, 162 (e.g., to save costs). However, utilizing both of the sensors 160, 162 may increase the accuracy and/or robustness of the techniques.

An engine control system 164 includes a controller 166 (e.g., engine control unit) configured to control operation of the engine 104, such as controlling airflow/fueling/spark to achieve a desired drive torque. This desired drive torque could be based, for example, on input provided by a driver of the vehicle 100 via an accelerator pedal (not shown). The controller 166 controls the throttle 116 and a plurality of fuel injectors 168 (e.g., one for each cylinder 124, only one shown) to provide a target fuel/air ratio based on driver or vehicle demands. The controller 166 may also perform fuel enrichment events (rich fuel/air ratio operation, such as for increased power or exhaust gas cooling) and lean fuel or fuel cutoff events (lean fuel/air ratio operation, or no fuel being injected during pedal-off deceleration). The controller 166 also implements at least a portion of the techniques of the present disclosure, which are described in greater detail below with respect to FIG. 2.

In the example embodiment, the controller 166 is in signal communication with one or more sensors 170, including an engine speed sensor 172, oxygen sensors 160, 162, a catalyst temperature sensor or model 174, and a manifold air pressure (MAP) sensor 176. The controller 166 also includes a cylinder misfire detection module 178 configured to detect a cylinder misfire in each engine cylinder 124, which may be based on the one or more sensors 170. As such, the controller 166 implements at least a portion of the techniques of the present disclosure based on one or more signals from the sensors 170 and cylinder misfire detection module 178, as described in FIG. 2.

Figure 2:
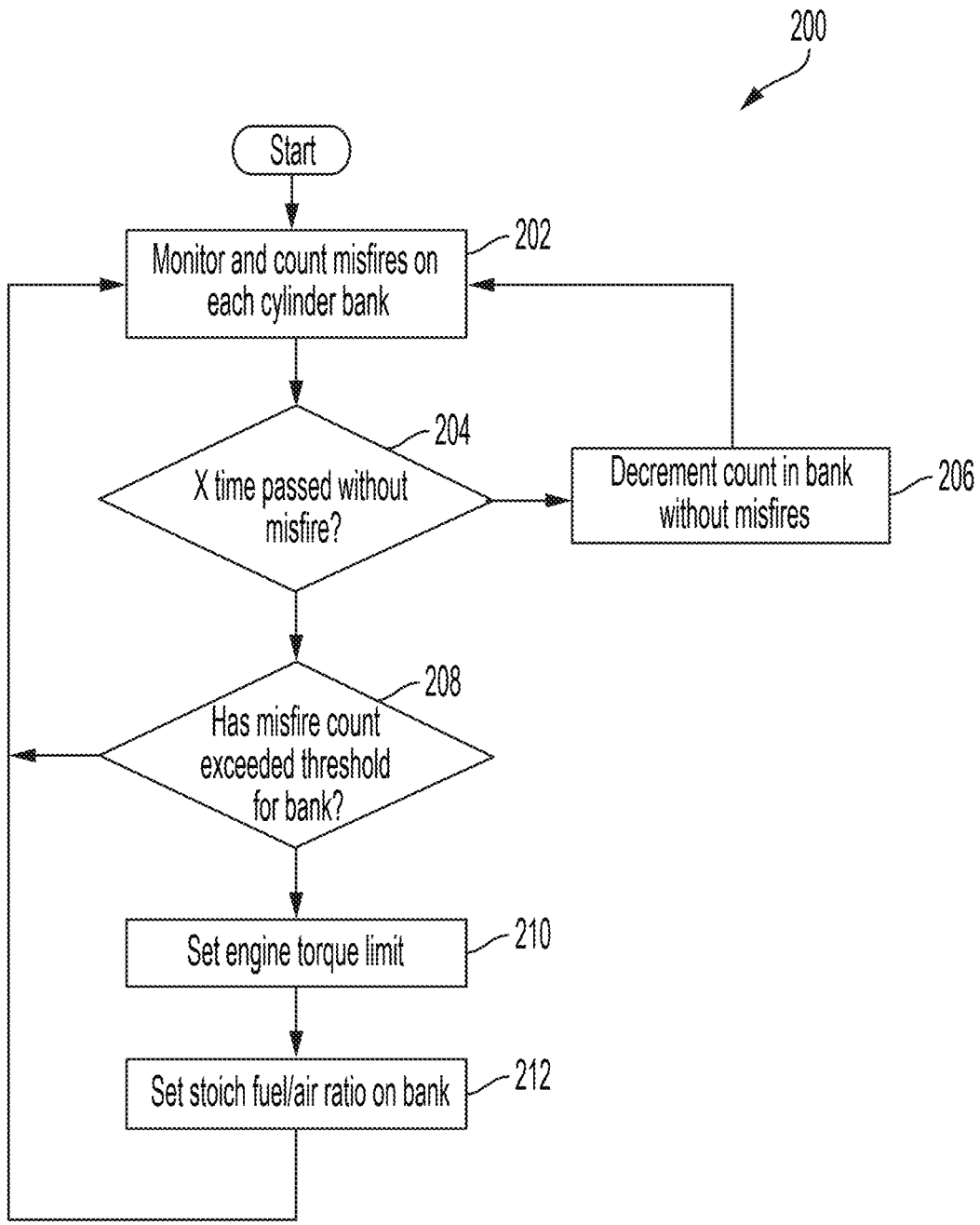
FIG. 2 is a flow diagram of an example method of protecting a catalyst during a cylinder misfire event, in accordance with the principles of the present application.

Referring now to FIG. 2, a flow diagram of an example method 200 of protecting catalysts during misfire events is presented. The method begins at step 202 where controller 166 ("control") monitors engine banks 130, 132 and tracks an accumulated number of cylinder misfires in each engine bank 130, 132. At step 204, control determines if a predetermined time has passed since a misfire in each of banks 130, 132. If the predetermined time has passed in one or more of banks 130, 132, then at step 206, control decrements the misfire count in that engine bank. The misfire count decrement may be a specified rate. Control then returns to step 202. If the predetermined time has not passed, control proceeds to step 208.

At step 208, control determines if the accumulated misfire count for each bank has exceeded a predetermined threshold count in that bank 130, 132. In the example embodiment, this predetermined threshold count is below a maximum misfire count where the system sets an engine misfire fault and commands disablement of all enrichment (rich fuel/air ratio), for example, per regulations. As such, this step is configured to pre-emptively initiate a catalyst misfire protection strategy before the engine misfire fault is set by the engine control system. If the accumulated weighted misfire count has not exceeded the predetermined threshold count, control returns to step 202. If the accumulated misfire count has been exceeded, control proceeds to step 210.

At step 210, control sets an engine torque limit and derates the engine 104 by reducing engine airflow. In one example, the engine torque limit is set to the highest allowable torque that will maintain the catalyst temperature at or below a predetermined threshold for the given vehicle. At step 212, control then sets the fuel/air ratio to stoichiometric for the engine bank(s) 130, 132 that have exceeded the predetermined threshold count. If a particular bank 130, 132 has not exceeded the predetermined threshold count, a normal operation target fuel/air ratio is maintained for that particular bank. Additionally, controller 166 begins open loop fuel/air control (as opposed to closed loop fuel/air control) for the protected cylinder bank of engine 104. In one example, closed loop refers to a feedback control system while open loop refers to a non-feedback control system. Control then returns to step 202.

Described herein are systems and methods for protecting catalysts during engine cylinder misfire events. Rather than wait for an engine misfire fault to be declared and subsequently disabling fuel enrichment to all engine cylinders, which can result in catalyst damage, the system pre-emptively initiates a catalyst protection strategy. The strategy includes counting misfires in each cylinder bank of the engine. If the accumulated weighted misfire count exceeds a predetermined threshold count in any bank, the system derates the engine and performs stoichiometric control only in that bank while the remaining bank(s) are operated normally with a target fuel/air ratio to continue to provide desired performance. Once a predetermined time has passed without cylinder misfires, the count is decremented until it reaches a predetermined minimum misfire count where the bank may once again be operated normally with a target fuel/air ratio.

It will be appreciated that the term "controller" or "module" as used herein refers to any suitable control device or set of multiple control devices that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above. It will also be understood that the description, including disclosed examples and drawings, is merely exemplary in nature intended for purposes of illustration only and is not intended to limit the scope of the present disclosure, its application or uses. Thus, variations that do not depart from the gist of the present disclosure are intended to be within the scope of the present disclosure.

What is claimed is:

1. A vehicle, comprising:
  an internal combustion engine having at least one cylinder bank;
  an exhaust system having a catalyst; and
  an engine control system with a controller configured to perform an operation to protect the catalyst during a cylinder misfire event, the operation comprising:
    monitoring and counting a number of cylinder misfires on each cylinder bank;
    determining if the cylinder misfire count exceeds a predetermined threshold count; and
    initiating a preemptive catalyst protection operation, in response to the cylinder misfire count exceeding the predetermined threshold count in a particular cylinder bank, the preemptive catalyst protection operation comprising: (i) setting a reduced engine torque limit and (ii) operating the particular cylinder bank in a stoichiometric fuel/air ratio, to thereby facilitate preventing excessively high temperatures at the catalyst due to the misfire event,
  wherein the controller is programmed to set a misfire fault if the number of cylinder misfires exceeds a maximum misfire count, and
  wherein the predetermined threshold count is less than the maximum misfire count to pre-emptively protect the catalyst during the cylinder misfire event.

2. The vehicle of claim 1, wherein the controller is programmed to operate the at least one cylinder bank normally with a target fuel/air ratio if the cylinder misfire count for that cylinder bank does not exceed the predetermined threshold count.

3. The vehicle of claim 1, wherein the controller is programmed to decrement the cylinder misfire count for each cylinder bank of the at least one cylinder bank if a predetermined amount of time has passed without a cylinder misfire.

4. The vehicle of claim 1, wherein the controller is programmed to set the reduced engine torque limit by limiting airflow through the internal combustion engine and catalyst.

5. The vehicle of claim 1, wherein the at least one cylinder bank includes a first cylinder bank with four cylinders and a second cylinder bank with four cylinders.

6. The vehicle of claim 5, wherein the exhaust system includes:
   a first exhaust passage with a first catalyst configured to receive exhaust gas from the first cylinder bank; and
   a second exhaust passage with a second catalyst configured to receive exhaust gas from the second cylinder bank.

7. A method of performing a catalyst protection operation during a cylinder misfire event for a vehicle having an internal combustion engine having at least one cylinder bank, and an exhaust system having a catalyst, the method comprising:
   monitoring and counting, by a controller, a number of cylinder misfires on each cylinder bank;
   determining, by the controller, if the cylinder misfire count exceeds a predetermined threshold count that is below a maximum misfire count where the controller is configured to set an engine misfire fault; and
   in response to the cylinder misfire count exceeding the predetermined threshold count and being below the maximum misfire count in a particular cylinder bank, subsequently, by the controller, (i) setting a reduced engine torque limit and (ii) operating the particular cylinder bank in a stoichiometric fuel/air ratio, to thereby facilitate preventing excessively high temperatures at the catalyst due to the cylinder misfire event.

8. The method of claim 7, further comprising operating, by the controller, the at least one cylinder bank normally with a target fuel/air ratio if the cylinder misfire count for that cylinder bank does not exceed the predetermined threshold count.

9. The method of claim 7, further comprising, by the controller, decrementing the cylinder misfire count for each cylinder bank of the at least one cylinder bank if a predetermined amount of time has passed without a cylinder misfire.

10. The method of claim 7, further comprising, by the controller, setting a misfire fault if the number of cylinder misfires exceeds the maximum misfire count.

11. The method of claim 10, wherein the predetermined threshold count is less than the maximum misfire count to pre-emptively protect the catalyst during the cylinder misfire event.

12. The method of claim 7, wherein said setting a reduced engine torque limit includes limiting airflow through the internal combustion engine and catalyst.

13. The method of claim 7, wherein the at least one cylinder bank includes a first cylinder bank with four cylinders and a second cylinder bank with four cylinders.

14. The method of claim 13, wherein the exhaust system includes:
   a first exhaust passage with a first catalyst configured to receive exhaust gas from the first cylinder bank; and
   a second exhaust passage with a second catalyst configured to receive exhaust gas from the second cylinder bank.

15. The method of claim 7, wherein setting the reduced torque limit is based on a highest allowable torque to maintain the catalyst at or below a predetermined threshold temperature.

16. A method of performing a catalyst protection operation during a cylinder misfire event for a vehicle having an internal combustion engine having at least one cylinder bank, and an exhaust system having a catalyst, the method comprising:
   monitoring and counting, by a controller, a number of cylinder misfires on each cylinder bank;
   determining, by the controller, if the cylinder misfire count exceeds a predetermined threshold count that is below a maximum misfire count where the controller is configured to set an engine misfire fault; and
   initiating a preemptive catalyst protection operation, in response to the cylinder misfire count exceeding the predetermined threshold count in a particular cylinder bank, the preemptive catalyst protection operation comprising:
   (i) setting, by the controller, a reduced engine torque limit based on a highest allowable torque to maintain the catalyst at or below a predetermined threshold temperature; and
   (ii) operating, by the controller, the particular cylinder bank in a stoichiometric fuel/air ratio, to thereby facilitate preventing excessively high temperatures at the catalyst due to the cylinder misfire event.

* * * * *